United States Patent [19]

Bell

[11] Patent Number: 4,562,742
[45] Date of Patent: Jan. 7, 1986

[54] CAPACITIVE PRESSURE TRANSDUCER
[75] Inventor: Robert L. Bell, Chatsworth, Calif.
[73] Assignee: Bell Microcomponents, Inc., Newbury Park, Calif.
[21] Appl. No.: 738,539
[22] Filed: May 24, 1985

Related U.S. Application Data

[63] Continuation of Ser. No. 638,491, Aug. 7, 1984, abandoned.

[51] Int. Cl.$^4$ .......................... G01L 9/12; H01G 7/00
[52] U.S. Cl. ...................................... 73/718; 73/724; 361/283
[58] Field of Search ................... 73/724, 718; 361/283

[56] References Cited

U.S. PATENT DOCUMENTS

| | | | |
|---|---|---|---|
| 2,714,703 | 8/1955 | Ruderfer | 73/724 |
| 3,479,879 | 11/1969 | Music | 73/718 |
| 4,089,036 | 5/1978 | Geronime | 73/718 |
| 4,295,376 | 10/1981 | Bell | 73/724 |
| 4,434,451 | 2/1984 | Delatorre | 73/718 |

Primary Examiner—Donald O. Woodiel
Attorney, Agent, or Firm—Fraser and Bogucki

[57] ABSTRACT

A capacitive pressure transducer is comprised of a deflectable diaphragm and a substantially planar reference plate, both preferably molded of ceramic. The diaphragm includes a sensor electrode ring disposed about a central region thereof and a concentric reference electrode ring substantially encompassing the sensor electrode, with a guard ring between the electrodes to electrically isolate the reference electrode from the sensor electrode. The reference plate is disposed in facing relation to the deformable flat surface of the diaphragm and includes a sensor electrode ring disposed and in opposition to the sensor electrode on the diaphragm to form a sensing capacitor therewith. Spacer means disposed in the central region between the diaphragm and the reference plate intercouple the two elements and maintain a substantially fixed dimension in the central region therebetween while permitting deformation of the diaphragm in response to pressure variations. The spacer means is conductive and facilitates electrical connection to the sensor electrode on the reference plate. A cover is disposed about the reference plate and coupled to the periphery of the diaphragm, and includes a reference electrode ring in facing relation to the reference electrode on the diaphragm to form a reference capacitor therewith.

30 Claims, 11 Drawing Figures

CAPACITIVE PRESSURE TRANSDUCER

This is a continuation of co-pending application Ser. No. 638,491 filed on Aug. 7, 1984, now abandoned.

BACKGROUND OF THE INVENTION

This invention relates to pressure transducers, and particularly to low cost but precision capacitive pressure transducers.

U.S. Pat. No. 4,295,376 is directed to force responsive capacitive transducers employing a configuration in which a diaphragm member is deflected in response to pressure variations which differentially deflect two different capacitor pairs formed between the diaphgram and a reference plate mounted on the diaphragm itself. In this configuration, an inner electrode pair is defined at or adjacent the central axis of the diaphragm and reference plate, and spacer elements positioned outside the radius of the inner central electrode pair hold the reference plate in generally parallel relation to its original position, despite deflection outwardly as the diaphragm becomes increasingly convex. An outer electrode pair formed by convex surfaces on the diaphragm and the facing part of the reference plate thus has a larger spacing as pressure increases, while the inner electrode pair has a smaller spacing. The opposite deviations in spacing between the inner and outer electrode pairs provide a reliable basis for generating substantially linearly varying signals representative of the pressure that is acting to deform the diaphragm.

This type of capacitive transducer has significant advantages over prior art structures, in which the facing elements and surface electrodes are spaced apart by a peripheral seal.

In a different form of capacitive pressure transducer, exemplified by U.S. Pat. No. 4,089,036 (Geronime), the deflectable diaphragm having an electrode surface bears a center post which serves as the support structure for a separate transverse disk on which another electrode surface is mounted, so that deflection of the diaphragm causes a variation in spacing between the electrodes. However, this system is not readily comparable because it is far more expensive to manufacture and much more cumbersome in use, and cannot be adapted to cover an adequately wide range of variations. The structure of previously referenced U.S. Pat. No. 4,295,376 is superior inasmuch as the component parts may be made of ceramic materials on which the electrodes are deposited as thin films, and the spacer structure between the diaphragm and the reference plate may be made of glassy material that can be deposited to precise thicknesses but has substantial strength when vitrified.

Nonetheless, certain problems have been encountered with this type of structure in meeting the constantly increasing demand for performance and versatility encountered in present applications. It is necessary, for high sensitivity in low pressure applications, to have a very thin diaphragm, which may be in the range of as little as 0.002″ to 0.010″ or more in thickness, but having relatively large radius so that they are very flexible. A molded ceramic part must be subjected to a precision lapping step in order to provide the precise thickness desired for sensor applications, but with a flexible low pressure range diaphragm the forces exerted during lapping cause slight but still significant deflection of the structure, resulting typically in a less flat or crowned diaphragm structure. This means that although the thicknesses of the diaphragms are uniform, the crowning effect is not, so that differential deflection of the inner electrode pair relative to the outer electrode pair is not the same. Hence, special efforts must be made to assure appropriate linearity.

In addition, the spacers on the diaphragm which couple to the reference plate, being at a substantial radius from the center, are subjected to torsion as the diaphragm curves. To alleviate stress problems, the spacers are coupled to the reference plate at small elongated arc segments that are defined between arc apertures in the reference plates, thus permitting torsional effects to be absorbed with lower stress on the spacers.

However, these radially positioned spacers cannot be large in size, and therefore a limit is reached as to the shock and vibration sensitivity of these parts. In addition, it must be borne in mind that the spacings involved are very small, typically being less than a few thousandths of an inch between the electrodes of a pair. A number of problems have arisen because the deflection characteristics of thinner (low pressure range) diaphragms are different than those for the thicker (high pressure range) diaphragms. With differentially deflected capacitor pairs, this means that device geometries have to be changed or that signal compensation networks have to be used. Either approach introduces substantial elements of cost. Thus fabrication problems can be significant, because it is desirable to assemble large quantities of units on a production basis. In addition, the electrode patterns on the different elements require specific geometries, in order that conductors into the different elements can follow non-interfering circuit paths.

SUMMARY OF THE INVENTION

Various advantages of the present invention are achieved by the provision of improved capacitive pressure transducers which are configured to provide centrally disposed, relatively large area, spacer means in the central region between a deflectable diaphragm and a reference plate, within a cover which spans the reference plate and is joined to the periphery of the diaphragm. The reference plate is maintained at a specific spacing with respect to the central region of the diaphragm, and any crown effect resulting from lapping a thin diaphragm provides only a certain degree of offset of the reference plate, which offset may be readily compensated. Furthermore, the reference plate retains its parallelism relative to the nominal plane of the diaphragm regardless of any crown effect. The central spacer structure is symmetrically mounted on the diaphragm and electrically isolated from an annular sensing electrode on the diaphragm. An annular sensing electrode adjacent the periphery of the reference plate and opposite the diaphragm electrode forms the other half of a variable capacitance sensor that is responsive to deformation of the diaphragm caused by pressure variations acting on it.

Further in accordance with the invention, it is advantageous to employ a single central spacer or a small group of spacer pads symmetrically disposed with respect to the central deformable region of the diaphragm. Although such spacers may be only of the order of one mil in height they have a much greater width, to absorb shocks as well as torsional forces. Moreover, because the spacer structure is centrally disposed on the diaphragm torsional effects on the reference plate are minimized due to the fact that the rate of change of deflection is smallest in this region. It is also advantageous to form a diaphragm with a substantial outer flange radius and to dispose the annular sensing electrode in this non-deflecting region. On deflection of the diaphragm only the coextensive sensing electrode on the reference plate moves. Further a relatively fixed gap reference capacitor is defined by an outer annular electrode on the diaphragm and a facing electrode on a spaced apart cover surface. An annular, electrically grounded, guard electrode may be disposed between the sensing electrode and the reference electrode on the diaphragm.

With this arrangement, spacings of approximately 1 mil between electrode surfaces on the diaphragm and the reference plate may be established and maintained with precision, and improved linear operation is achieved, particularly with thin diaphragms. Moreover, the deflecting characteristics of both thin and thick diaphragms are alike, so production units need vary only as to diaphragm thickness to provide units covering different pressure ranges. In addition, a conductive path between the sensor electrode and the diaphragm surface is readily provided through the spacer means itself, the disposition of the two electrodes forming the capacitive sensor enable accuracy to be maintained despite slight misalignment or eccentricity relative to the central axis.

In one specific transducer in accordance with the invention, the spacer is a single centrally disposed pad within a diameter that is less than 15% of the diameter of the deformable diameter region. The diaphragm incorporates a relatively large radial flange, and both the sensor electrode and reference electrode are disposed on this substantially non-deformable surface. The spacer is of a conductive glass composition and is used to complete the conductive path from the sensor electrode on the reference plate to the diaphragm surface.

In another example of a transducer, a number of relatively wide spacers are symmetrically disposed about the central axis mechanically coupled to a thin web region of the reference plate, and within a diameter that is 25% of the diameter of the deformable region. This arrangement may receive pressurized fluids on both sides of the diaphragm so as to measure the pressure differential.

BRIEF DESCRIPTION OF THE DRAWINGS

A better understanding of the invention may be had from the following description, taken in conjunction with the accompanying drawings, in which.

DETAILED DESCRIPTION OF THE INVENTION

Figure 1:
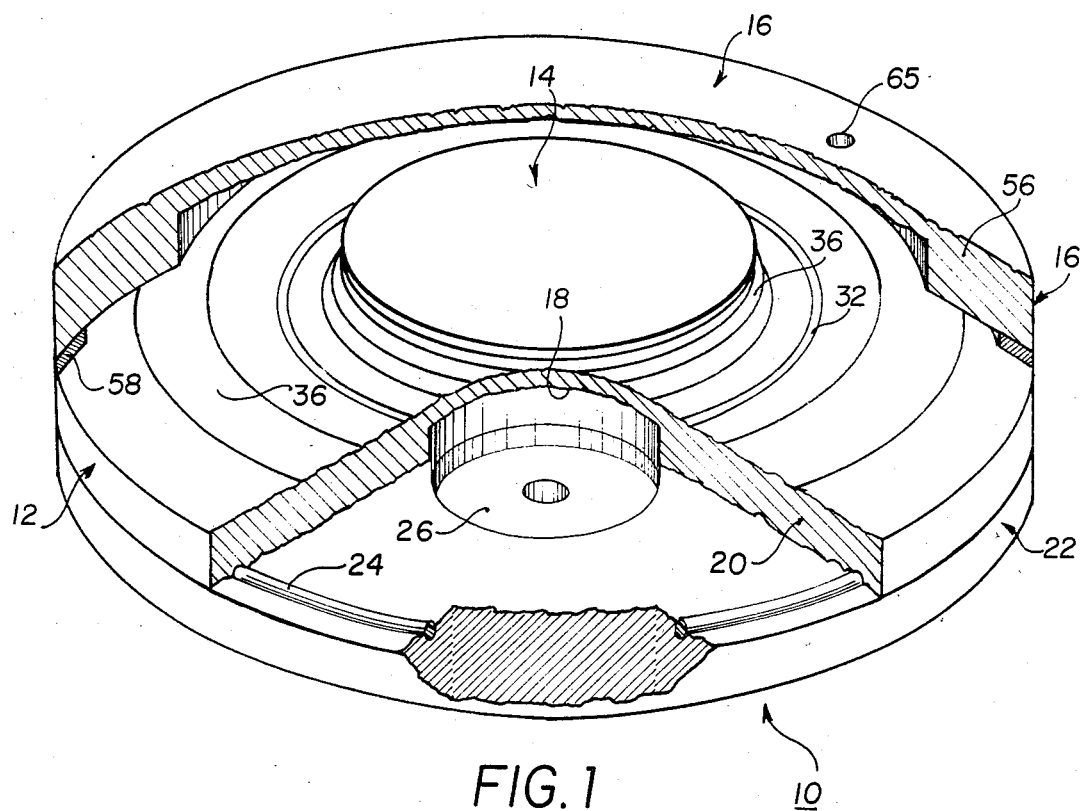
FIG. 1 is a simplified perspective view, partially broken away, of a transducer device in accordance with the invention.
Figure 2:
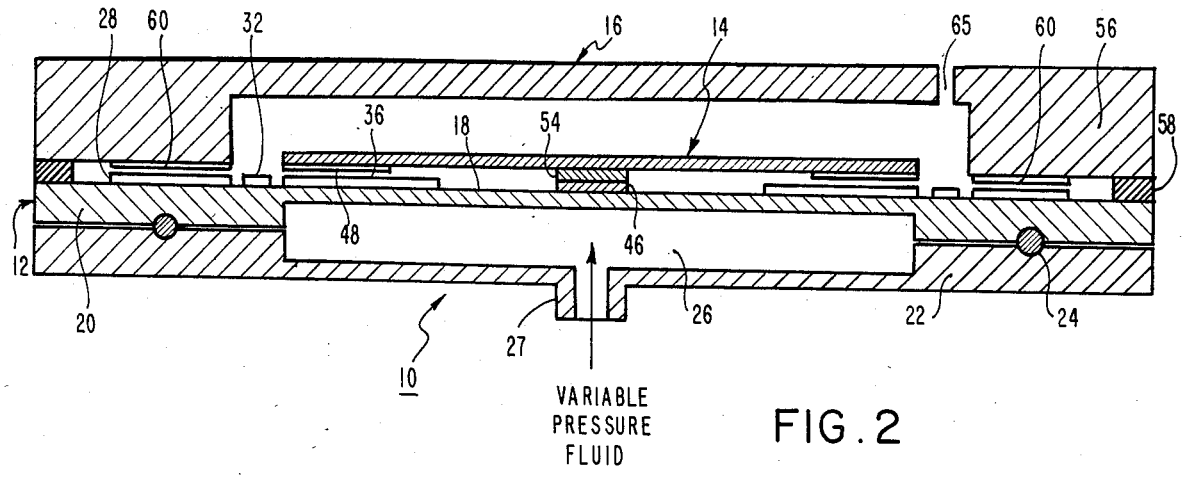
FIG. 2 is an elevational cross sectional view, not to scale, of the device of FIG. 1, showing a diaphragm and coupled reference plate, including a central spacer structure, and overlying cover, with associated pairs of capacitive sensing and reference electrodes.

Referring to FIGS. 1-6 of the drawings, an example of a transducer in accordance with the invention, indicated at 10 in FIGS. 1 and 2, comprises three principal operative parts, namely a base or diaphragm 12, a reference plate 14 coupled centrally to the diaphragm and a cover 16 sealed to the periphery of the diaphragm 12. It should be appreciated that the drawings, particularly the sectional views, are not to scale because the films and deformable webs employed are so thin they cannot be clearly depicted without exaggeration.

The diaphragm 12 is circular and concentric about a central axis and has an undercut bottom portion so that it defines a deformable web 18 of selected thickness for the desired pressure range, and an outer ring or flange 20 which depends downwardly from but is integral with the diaphragm disk. The diaphragm 12 is a molded high density ceramic part that can be made to relatively accurate precision, but which nevertheless must be lapped to a given final thickness so as to be properly responsive to a given pressure range. For low pressure ranges the diaphragm thickness may be only a few thousandths of an inch, giving rise to the possible "crown" or other non-linearities in the center. High density ceramics are merely one example of mechanically elastic materials that exhibit substantially no plasticity and may be used for these components. Quartz, silicon and silica are alternative materials of the same class, but are not as readily molded as ceramics now available.

The diaphragm 12 is mounted on a support and sealing structure 22, typically with an O-ring seal 24 around the periphery of the depending flange 20 and in contact with the underlying support structure 22. Gas or liquid, typically liquid, whose pressure is to be ascertained is fed through the support structure 22 into a chamber or enclosed volume 26 in contact with the underside of the diaphragm via an inlet port 27. This liquid may be conductive and if so can introduce variations in the capacitance readings unless proper measures are taken on the upper surface of the diaphragm. For absolute pressure measurement, the upper surface of the diaphragm 12 is under vacuum when a liquid under pressure is in contact with the underside.

Figure 3:
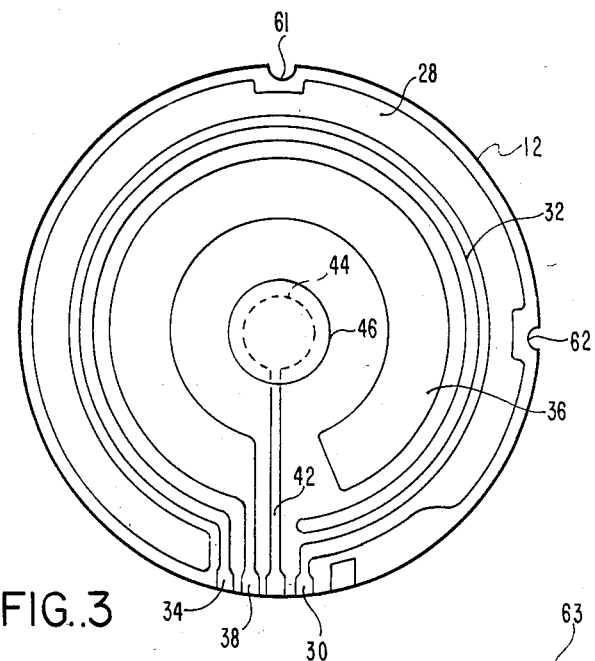
FIG. 3 is a plan view of the diaphragm of the transducer of FIGS. 1 and 2, showing the peripheral reference electrode, guard electrode, sensor electrode and centrally positioned conductive spacer.

The upper side of diaphragm 12 is substantially flat, apart from any crown effect that may be introduced during finishing, and includes a number of thin film, typically gold, conductive sections which are arranged in generally concentric annuli fashion, as shown most clearly in FIG. 3. These include an outer thin film annulus 28 forming one electrode of a reference capacitor, such reference electrode 28 terminating in a conductive pad 30, to which an external wire (not shown) is typically soldered or epoxied. Immediately within the reference electrode 28 is a thin concentric guard electrode 32 which is also annular and terminates in a separate exterior conductive pad 34, which is coupled to electrical ground (not shown). The guard electrode 32 substantially isolates the reference electrode 28 from an inner sensing electrode 36, and dissipates stray charges that may exist in the unit, such as may be caused by the use of a conductive variable pressure media. The sensing electrode 36, which forms part of a variable capacitor responsive to pressure, is also annular. In this example it has a relatively wide radius greater than the radial width of the reference electrode 28. The sensing electrode 36 terminates in another conductive pad 38 to which an external wire (not shown), can be connected.

The sensing electrode 36 substantially surrounds the mid-region of the diaphragm 12, but as seen in FIG. 3 all electrodes 28, 32, 36 are open at one side to permit radial access from that side of the diaphragm 12 for a thin film conductive line 42 to a conductive pad 44 at the central axis of the concentric deformable web 18. The central pad 44 is shown in dotted lines only, because of an overlying spacer and interconnector element 46 that is generally circular in plan view. An external wire (not shown) can be connected as by soldering or epoxy to the exterior portion of the conductive line 42.

Figure 4:
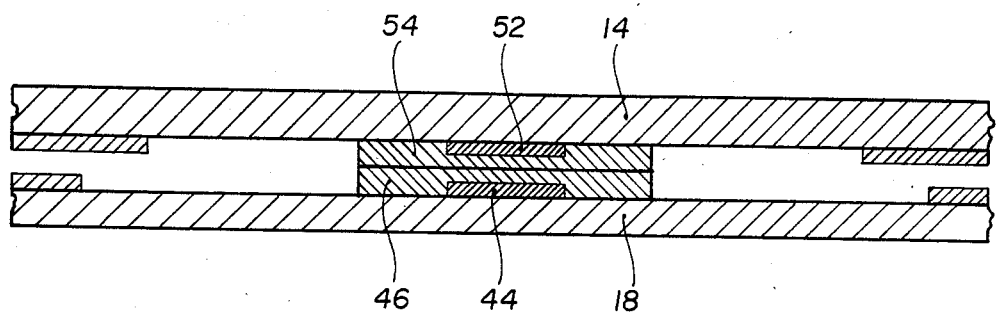
FIG. 4 is an enlarged fragmentary sectional view of a part of the central region of the diaphragm.

As shown particularly in FIGS. 2 and 4, the spacer and interconnector 46 on the web 18 is a relatively low height (here ½ mil) element, positioned on the upper surface of the central region of the diaphragm 12, above the central gold pad 44. The spacer element 46 is comprised of prefired conductive paste containing approximately 50% glass which is laid down over the thin gold pad 44 by a thick film technique. Thus the resulting spacer element 46, including the gold underlayer 44, has the predetermined height, specifically half a mil high on the diaphragm, in the present example. While the spacer 46 is relatively thin it has a relatively large area, such as 4–10 mm² for an 18 mm diameter diaphragm. In this example the diameter of the spacer 46 is of the order of 15% of the diameter of the reference plate 14 and about 4% of the reference plate area. As shown hereafter the radial limits of the spacer 46 can be extended to limits determined by the deformation characteristics of the various elements under stress.

As described in greater detail hereafter, the spacer 46 in the central portion of the diaphragm 12 engages a complementary spacer and interconnector element, also approximately one-half mil high in the present example, on the undersurface of the reference plate 14. The reference plate 14 is essentially circular, and like the diaphragm 12, is also fabricated of molded ceramic material, and has a diameter less than the diameter of the diaphragm but greater than the deformable web 18 portion. Positioned symmetrically above the diaphragm 12 as shown in FIGS. 2 and 4, the reference plate 14 spans the sensing electrode 36 on the diaphragm, but the sensing electrode 36 is primarily on the essentially nondeformable flange 20 surface rather than on the deformable web 18 in this example.

Figure 5:
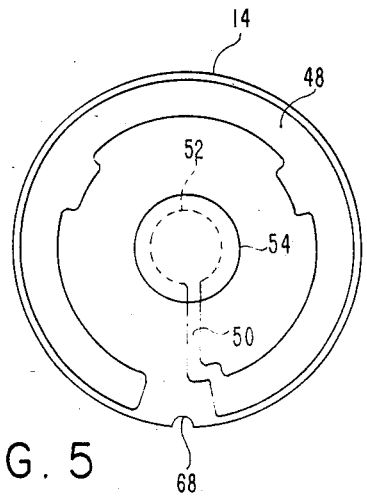
FIG. 5 is a plan view of the side of the reference plate that faces the diaphragm, showing the peripheral sensor electrode and centrally positioned spacer.

Referring now to FIG. 5, reference plate 14 has on its undersurface (shown in the Figure) a peripheral and annular sensing electrode 48 which leads through a radial line conductor 50 to a central thin conductive pad 52. This pad 52 is symmetrically placed in the central region of the undersurface of the reference plate 14, complementary to the conductive pad 44 on the diaphragm 12. The sensing electrode 48, the radial line conductor 50 and the conductive pad 52 are again typically formed of a thin metallic film, typically gold. It will be noted that the radial dimension of the sensing electrode 48 on the reference plate 14 is smaller than that of the facing sensing electrode 36 on the diaphragm 12, as best seen in FIG. 2. More specifically, the sensing electrode 36 overlaps both the inner and outer edges of the sensing electrode 48, so as to reduce criticality of alignment between such sensor electrodes. However in many applications such a relationship is not needed.

As in the case of the diaphragm 12, the reference plate 14 includes a symmetrically positioned spacer and interconnector element 54, superimposed on the central pad 52. The spacer 54 is formed of a prefired conductive paste of the same composition as the spacer and interconnector element 46 on the diaphragm 12. The height of the resulting spacer element 54, including the thin gold underpad 52, is also approximately one-half mil high, the same height as the interconnector elements 42 on the diaphragm. It will be noted that the spacers 46 and 54 on the diaphragm 12 and the reference plate 14 respectively, are substantially the same size and have substantially the same symmetrical positioning in the central portion of each of these elements. When joined together into a unitary element they firmly support the reference plate 14 in position above the diaphragm 12 as the web 18 deforms.

Figure 6:
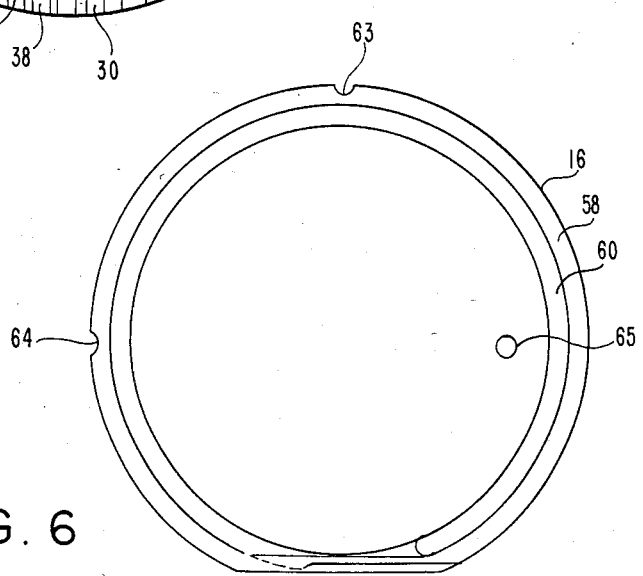
FIG. 6 is a plan view of the underside of the cover, showing the peripheral reference electrode, for mounting on the diaphragm with such peripheral electrode disposed in opposite spaced relation to the peripheral reference annular electrode on the diaphragm.

As best seen in FIGS. 2 and 6, the cover 16 for the device comprises a substantially circular generally planar member having an outer flange 56 and a glass outer bead 58, here of a height of about 1 mil around the bottom edge of flange 56. The cover 16 also is formed of molded ceramic and has a diameter substantially the same as the diameter of diaphragm 12. A substantially annular reference electrode 60 typically of a thin metallic film such as gold, is disposed around the lower inner peripheral surface of the flange 56, just inside the outer bead 58. The outer bead is in the form of a vitrifiable paste which when fired, seals the flange 56 of the cover 16 to the periphery of the diaphragm 12 around the upper surface thereof, with the reference electrode 60 in direct opposition to the reference electrode 28 on the diaphragm, as seen in FIG. 2. Small notches 61 and 62 in the periphery of the cover 16 (FIG. 6) and small notches 63 and 64 in the diaphragm 12 (FIG. 3) permit these elements to be properly aligned and positioned during assembly. When the volume above the diaphragm 12 is to be evacuated for absolute pressure measurements, a hole 65 in the cover is sealed with solder, epoxy or by other means.

PROCESS FOR PRODUCING AND ASSEMBLING THE UNIT

The diaphragm 12 is first molded, then lapped to the desired diaphragm thickness for the deformable web 18, and the conductive pattern is laid down as thin gold films, with outer reference electrode 28, guard ring 32, sensor electrode 36, small center pad 44 and radial conductive line 42. The spacer 46 is then laid over the conductive pad 44 in the central region of the diaphragm, by laying down a glass-containing conductive paste to a height of half a mil over the pad 44 and prefiring to fix the spacer 46 in place.

The reference plate 14 comprising a flat disk is molded and first receives the peripheral sensor electrode 48 and the coupled internal pad 52 in the central region and the radial conductive path 50, in the form of thin gold films. Then a glass-containing conductive paste is laid down to a half mil height over the conductive pad 52 and the reference plate 14 is prefired to substantially fix the spacer 54 over the conductive pad 52.

The cover 16 is made by molding the part with the peripheral flange 56, and depositing a thin film of gold on the inner side of the undersurface of the flange, to form the reference electrode 60, such film leading to an external conductive pad 66 for circuit connections at one end. A thin peripheral layer, 1 mil high, of a vitrifiable glass-containing paste is then laid down around the outer boundary of the flange 56 to form the bead 58 for adhesion to the diaphragm.

In assembling the components of the unit, the reference plate 14 shown in FIG. 5 is turned over and is placed over the diaphragm 12, the two opposed spacer elements 46 and 54 on the diaphragm 12 and reference plate 14 respectively being in opposition, as in FIGS. 2 and 4. The reference plate and the diaphragm are positioned by the alignment of a peripheral notch 68 provided on the reference plate 14 (FIG. 5), with the peripheral notch 63 on the diaphragm. Positioning notches at other positions or positioning pins, or other means of alignment may alternatively be used. The reference plate 14 is then held in fixed position with respect to the diaphragm 12 by means of a conventional fixture (not shown). These components are placed under light pressure and are fired at approximately the same glass vitrification temperature as was previously used for producing the spacers 46 and 54, causing them to fixedly adhere, with the reference plate 14 being parallel to the surface of the diaphragm 12, and with the distance between the sensor electrode 36 on the diaphragm and the sensor electrode 48 on the reference plate being approximately 1 mil.

The two conductive spacers 46 and 54 on the diaphragm and the reference plate respectively which are thus attached form a unified spacer and interconnector which physically attaches the reference plate 14 to the diaphragm 12. Any vertical motion or displacement of the diaphragm 12 relative to the central axis causes vertical displacement of the reference plate 14 in response. Thus the displacement is responsive to variable pressures applied to the undersurface of the diaphragm by the pressure fluid in chamber 26, or pressure variations at the upper side if used. The term "vertical" is used only for ease of reference in relation to displacement of the reference plate 14 with respect to the web 18 and is not to be taken as requiring any particular attitude of the transducer.

The cover 16 is then placed in position over the periphery of the diaphragm 12, with the glass bead 58 on the cover flange 56 in contact with the upper surface of the diaphragm around its periphery. The cover 16 is aligned over the diaphragm by alignment of notches 61 and 63, and 62 and 64. The cover is held in a fixture (not shown) at the peripheral notches, pressed down lightly and heated to a temperature sufficient to vitrify the glass peripheral bead 58 and thus to unify the structure. Because the glass bead is about 1 mil in height, when the cover is thus assembled over the diaphragm, the reference electrode 60 on the lower periphery of the cover is disposed opposite and facing the reference electrode 28 on the diaphragm, with a distance of about 1 mil between the two reference electrodes.

OPERATION OF THE DEVICE

When the unit has been assembled as described above to form the capacitive pressure transducer 10 of the invention, two capacitors are formed. An outer reference capacitor is established by reference electrodes 60 and 28 between the cover 16 and the top of the diaphragm 12, and remains substantially constant in displacement as pressure variations cause the central web 18 of the diaphragm 12 to be deformed with greater or less convexity. Any small structural part is subject to minute displacements under substantial stress, but these can be ignored in most instances or electrically compensated if necessary. The second capacitor or sensing capacitor is formed between the oppositely facing sensing electrodes 48 and 36 between the reference plate 14 and the diaphragm 12.

As the diaphragm 12 deforms, the reference plate 14, which remains substantially flat and parallel to the principal plane of the diaphragm, moves up or down with the center of the web 18. Thus the sensing electrode 48 on the reference plate 14 moves to a selected spacing relative to the sensing electrode 36, which is attached to the thick flange 20 part of the diaphragm 12 and is essentially immobile. The voltage level of the sensing electrode 48 on the reference plate 14 is derived through the conductive path that leads via the radial line conductor 50 to the central portion of the reference plate 14 and then through the intercoupling path formed by the first gold pad 52, the joined electrically conductive spacers 46, 54, the second gold pad 44 and out through the conductive line 42 to the external contact point on the diaphragm 12. Concurrently, the spacing between the reference electrode 60 on the inner side of the cover and the outer reference electrode 28 on the diaphragm remains the same so as to give a constant stable capacitive reference value that can be used to compensate for temperature and other variables. The capacitive signal variation between the sensing capacitor electrodes can be taken as a very accurate measure of the pressure that is acting to deform the diaphragm.

Thus, it can be seen that extremely small spacings are utilized in this system, and that minute deflections are accurately detected for high linearity and sensitivity. The spacing between the two halves of the sensing capacitor is only about 1 mil (nominal) and the same is true with respect to the reference capacitor. The presence of stray fields, the influence of a conductive oil or other substance under the diaphragm and the minute signal variations that can be introduced for other reasons under these extremely tight dimensions are kept to a minimum by virtue of the presence of the guard electrode 32.

The small hole 65 provided in the cover 16, which leads into the volume about the reference plate 14 and above the diaphragm 12, is used when the transducer is to be employed as a gauge device. However, if it is used as an absolute pressure sensor, then the hole 65 is sealed with solder or other material after a vacuum is drawn in the volume about the reference plate.

Figure 7:
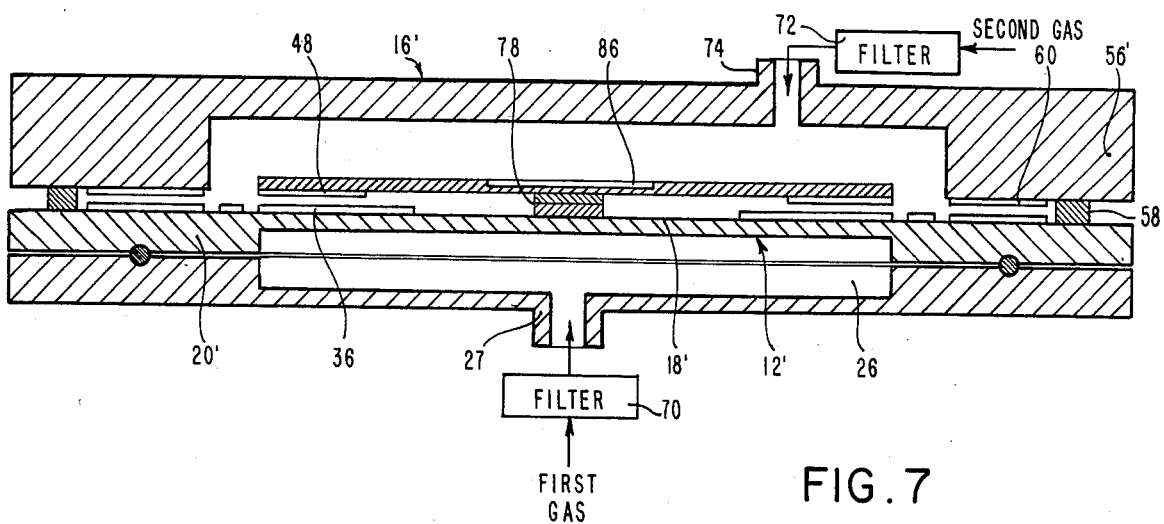
FIG. 7 is a side sectional view of a different transducer in accordance with the invention using a different geometry of diaphragm and cover and arranged to respond to differential pressure.
Figure 9:
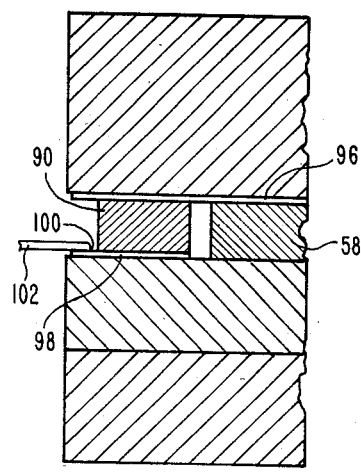
FIG. 9 is a fragmentary, enlarged side sectional view of a portion of the device of FIGS. 7 and 8, showing further details of the use of external spacer elements therein.

A different exemplification of the invention, referring now to FIGS. 7-11, is arranged with a different geometry and fabricated in a somewhat different fashion, and is operated as a differential pressure transducer. Again, the drawings are not to scale inasmuch as the deformable web of the diaphragm and the thin filmed deposits cannot be shown in adequately small size. The principal parts of the construction are numbered to correspond to the arrangement of FIGS. 1–6, and only the differences are discussed in detail. At the inlet port 27 to the underside of the diaphragm 12' as seen in FIG. 7, a first fluid, here a gas, is entered into the volume 26 through a filter 70 that prevents water and other conductive media from entering the system. A second gas is similarly coupled through a filter 72 into the volume about the reference plate 14' through a second inlet port 74. While liquids can be used as the pressurizing source, they must either be of adequate purity and nonconductive or the pressure must be exerted on the opposite sides of the diaphragm 12' in closed liquid systems which are pressurized by the variable pressure source through isolating diaphragms.

In the mid region of the reference plate 14' (FIG. 11), there are three, instead of one, conductive spacers 76, 77, 78, fabricated as previously described by uniting previously separate half-height conductive elements screened onto the underside of the reference plate 14' and the upper side of the deformable web portion 18' of the diaphragm 12'. The sensing electrode 48 on the reference plate is coupled by a conductive line 50' and an underlying thin film pad to one of the spacers 76. From this spacer 76 a circuit is completed by an underlying gold pad 80 on the diaphragm 12' (FIG. 8) and a conductor 30' leading to the accessible edge of the diaphragm 12'. Dummy gold pads 81, 82 on the diaphragm 12' are employed for symmetry in this construction. Above the spacers 76, 77, 78 on the reference plate 14', a shallow recess 86 is incorporated in the reference plate 14' to provide a greater degree of flexure in response to deformation of the deformable web 18. In this example, the flange 20' of the diaphragm commences at a greater radius than in the example of FIGS. 1–6, so that the sensing electrode 36 and the coextensive sensing electrode 48 are in the outer region of the deformable web 18'. The guard electrode 32 and reference electrode 28' are disposed as previously described on the diaphragm 12'.

Those skilled in the art will recognize that this disposition of three relatively large area spacers 76, 77, 78 at a small radius from the center of the deformable web 18' places the spacers at regions of different slope on the surface of the web 18' when it is deformed, either concavely or convexly by the net differential pressure established by the first and second gases. The spacers, however, are within a diameter which is less than 25% of the total diameter of the deformable web, and provide a total surface area that is at last two times greater than constructions previously utilized. In addition, the spacers are at a much smaller radius from the center than the prior art construction in which the spacers are disposed between concentric annular electrodes. Thus, although each spacer slopes at a different angle relative to the nominal plane of the web 18', when it is deformed, the maximum difference in slope is limited. In addition, torsional forces on the reference plate 14' (not the diameter of the diaphragm but the reference plate, as aforesaid) are absorbed in the central thin web portion of the diaphragm created by the recess 86 in the diaphragm 14' surface. The position of the spacers 80, 81, 82 relative to the overall diameter of the reference plate 14' is important, because torsional forces are exerted close to the central region rather than near the outside periphery where they might cause deformation affecting the sensing electrode 48. Parallelism between the reference plate 14' and the nominal plane or unflexed plane of the deformable web 18' is maintained by the symmetrical disposition of the multiple spacers 80, 81 and 82 and the reduction in stressing of the reference plate 14'. The arrangement also provides a substantial increase, of the order of two times or more, in the loads and stresses which can be overcome.

Figure 10:
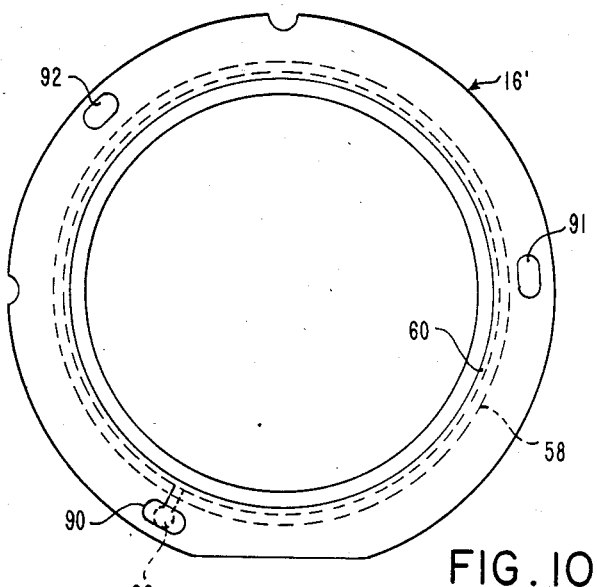
FIG. 10 is a plan view of the cover structure that is employed in the transducer of FIGS. 7-9.
Figure 8:
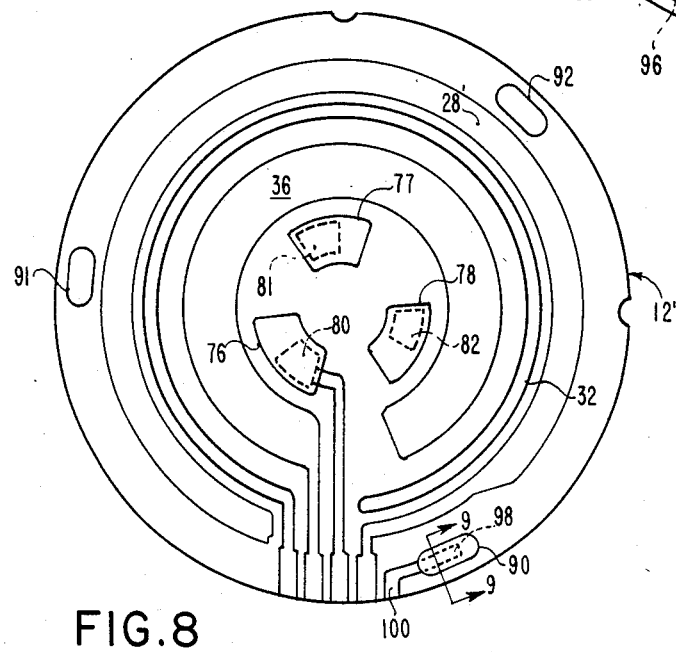
FIG. 8 is a plan view of the diaphragm structure of the transducer of FIG. 7 showing a different disposition of spacers and electrodes.
Figure 11:
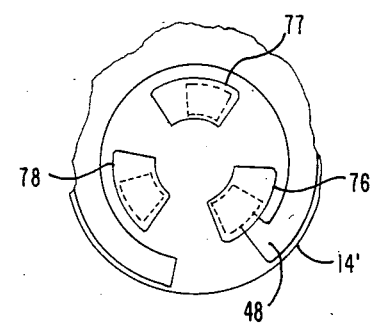
FIG. 11 is a fragmentary plan view of a portion of the reference plate structure seen in the transducer of FIGS. 7-10.

Another feature of the arrangement of FIGS. 7–11 can be seen in the disposition of the outer flange 56' of the cover 16' and the flange 20' of the diaphragm 12', which extend beyond the glass bead 58, and in the incorporation of a set of three conductive spacers 90, 91 and 92 at equal points about the periphery of the diaphragm 12' (FIG. 8) and the cover (FIG. 10). As seen in FIG. 10, the reference electrode 60 is coupled to one of the pads 90 by a conductive line 96 that extends through the glass seal 58 region. An underlying gold pad 98 on the diaphragm 12' leads to an externally accessible contact area 100 to which, as may be seen in FIG. 9, an external conductor 102 may be coupled.

The exterior conductive pads 90, 91, 92 are initially screened onto the diaphragm 12' and onto the cover 16' as half layers, as previously described. Again, a typical example will use a 1 mil total height. Using screening techniques, the processor is assured of a uniform height between the internal pads 80, 81, 82 and the external pads 90, 91, 92, so as to enhance the precision of the device in the parallelism and placement of the parts. The opposing half-height spacer surfaces are first fused and hardened on the diaphragm 12' and cover 16' separately, and thereafter the glass bead 58 is applied in frit form, the entire assembly is placed together and held in a fixture, and a final high temperature step, suitable for vitrification of the glass frit into the bead 58, and for uniting the spacer halves into the interior spacers 80, 81, and 82 and the outer spacers 90, 91 and 92, is completed. The only extra step involved is screening of the spacer halves onto the cover, but this entails no special requirements. The system also provides an additional external contact area 100 on the diaphragm, in the region of the other externally accessible contacts, for connection to the reference electrode on the cover 16'.

Further, as shown and described above, the spacing between the sensing electrodes 36 and 48 is the same as the spacing between the reference electrodes 28 and 60. However, if desired, the reference electrodes can be positioned so that the space therebetween is different from the spacing between the sensor electrodes, it being again noted that during operation of the device, the spacing between the reference electrodes on the cover and the outer periphery of the diaphragm remains substantially constant.

There are accordingly several important differences between the structure of the device of the present invention and that disclosed in U.S. Pat. No. 4,295,376. In the first place, only a single capacitor, the sensing capacitor, is formed between the diaphragm and the reference plate mounted on the diaphragm, and the reference capacitor is formed between the cover and the diaphragm. In contrast, in the device of the prior patent, both the sensing capacitor and the reference capacitor are formed by two different capacitor pairs formed between the diaphragm and a reference plate mounted on the diaphragm. In the present device, the distance between the reference electrodes of the reference capacitor remains substantially the same regardless of the displacement of the diaphragm, whereas in the previously patented device the distance between the reference electrodes of the reference capacitor varies, along with the distance between the sensor electrodes of the sensor capacitor, with changes in displacement of the diaphragm in response to pressure variations. Further, in the present device the spacer element is disposed centrally for connection of the reference plate to the diaphragm, to maintain a substantially fixed dimension in the central region therebetween while permitting deformation, resulting in relatively little if any, bending of the reference plate during displacement of the diaphragm up and down, whereas previously the spacer elements were positioned outside the radius of the central electrode pair forming one of the capacitors and thus transmitted substantial stress and deformation to the reference plate, and caused unwanted deflections of the reference plate in response to displacement of the diaphragm.

From the foregoing, it is seen that the present invention provides an improved capacitive pressure transducer of simplified structure, and which alleviates stress and distortion problems in the spacers coupling the reference plate to the diaphragm, and in the reference plate itself, during operation of the device resulting from displacement of the diaphragm in response to pressure variations. The device can be designed to be highly sensitive to measure relatively small pressures, but also essentially the same structure with a greater web thickness can be used for measuring relatively high pressures. The structure of the device is such that the components can be manufactured and assembled in large quantities of units on a production basis without fabrication problems.

Since further changes and modifications of the invention will occur to and can be made readily by those skilled in the art without departing from the invention concept, the invention is not to be taken as limited except by the scope of the appended claims.

What is claimed is:

1. A capacitive pressure transducer comprising:
a diaphragm comprising a flanged peripheral member having a central web deflectable in response to a pressurized fluid;
a cover coextensive with but spaced apart from the web and attached to the diaphragm at the flanged peripheral member;
first thin film means defining a reference electrode pair on the diaphragm outside the web and on the opposing portion of the cover;
reference plate means disposed between the diaphragm and cover and including spacer means for coupling the reference plate means to the web; and
second thin film means defining a variable electrode pair on the web and the opposing portion of the reference plate means.

2. The invention as set forth in claim 1 above, wherein the spacer means is substantially symmetrically positioned relative to the deflectable portion of the central web and the central web is substantially concentric about a central axis.

3. The invention as set forth in claim 2 above, wherein the spacer means is a single spacer centrally positioned on the central web and having a diameter of the order of 15% of the diameter of the deformable portion of the central web.

4. The invention as set forth in claim 2 above, wherein the spacer means comprises a number of spacers symmetrically spaced about the central axis within a region which has a diameter of the order of 25% of the diameter of deformable region of the central web and the spacers have an area of the order of 3% of the area of the reference plate means.

5. The invention as set forth in claim 4 above, wherein the reference plate means includes a thin web region encompassing the area engaged by the spacers and the spacer means further comprises a number of peripheral spacers between the diaphragm and the cover.

6. The invention as set forth in claim 1 above, wherein the diaphragm has a flat, electrode bearing, surface and is of ceramic material, wherein the spacing between the reference plate means and the diaphragm is of the order of one mil, and wherein the spacer means is conductive and the transducer further includes conductor means coupling the variable electrode element on the reference plate means to a region of the diaphragm via the spacer means.

7. The invention as set forth in claim 1 above, wherein the transducer is configured to deform the diaphragm in response to pressures from either or both sides, wherein the central web of the diaphragm is concentric about a central axis and wherein the electrodes are annuli substantially concentric with the central axis.

8. The invention as set forth in claim 1 above, wherein the first and second thin film means are both within parts of the region on the diaphragm that is coextensive with the flanged peripheral member of the diaphragm and wherein the transducer further comprises an electrically grounded guard band electrode on the diaphragm between the variable electrode and the reference electrode thereon.

9. In a pressure responsive capacitive transducer in which a reference plate bearing an electrode is mounted on the deformable portion of a diaphragm having a substantially coextensive electrode, the improvement comprising:
a conductive spacer centrally disposed on the deformable portion of the diaphragm and coupled to both the reference plate and the diaphragm, the spacer comprising a conductive element having a height of less than 2 mils and a width of less than about 25% of the diameter of the deformable portion of the diaphragm;
means providing an electrical signal conductor on the diaphragm; and
means coupling the electrode on the reference plate to the electrical signal conductor through the spacer.

10. The invention as set forth in claim 9 above, wherein the diaphragm includes an outer flange concentrically disposed about and integral with the deformable portion, and on the opposite side from the reference plate, the outer flange being substantially non-deforming in response to pressure, and wherein the electrode on the diaphragm is coextensive with a portion of the flange and not within the deformable portion such that deformation of the deformable portion results in movement of the reference plate electrode only.

11. The invention as set forth in claim 10 above, wherein the diaphragm has a substantially flat electrode bearing surface including a sensing capacitor electrode at an inner radius coextensive with a portion of the outer flange and a reference electrode at a greater radius thereabout and wherein the transducer further includes a cover encompassing the reference electrode and coupled to the flange region of the diaphragm outside the reference electrode, the cover including a reference surface spaced apart from the diaphragm by a predetermined distance, and reference electrode means thereon substantially coextensive with the reference electrode on the diaphragm.

12. The invention as set forth in claim 9 above, wherein the spacer is substantially centrally disposed on the deformable portion of the diaphragm such that stresses of deformation are minimized and absorbed within the spacer, wherein the electrodes are thin films, and wherein the electrode area on the diaphragm is greater than on the reference plate.

13. A capacitive pressure transducer comprising:
a diaphragm having a substantially flat deformable surface, the diaphragm including a sensor electrode disposed about a central region thereof, and a reference electrode substantially encompassing the sensor electrode;
means coupled to at least one side of the diaphragm for providing a fluid, whose pressure is to be measured into contact with the diaphragm to deform the same;
a substantially planar reference plate disposed in facing relation to the deformable surface of the diaphragm and including a sensor electrode disposed about the central region and in opposition to the sensor electrode on the diaphragm to form a sensing capacitor therewith;
spacer means disposed in the central region and between the diaphragm and the reference plate to maintain a substantially fixed dimension in the central region therebetween while permitting deformation of the diaphragm; and
cover means disposed about the reference plate and coupled to the periphery of the diaphragm and including a reference electrode in facing relation to the reference electrode on the diaphragm to form a reference capacitor therewith.

14. The invention as set forth in claim 13, wherein the spacer means is disposed in a region of convex curvature of the diaphragm when the diaphragm is deformed toward the reference plate.

15. The invention as set forth in claim 14 above, wherein the spacer means comprises a single centrally disposed conductive spacer pad.

16. The invention as set forth in claim 13 above, wherein the spacer means comprises a plurality of symmetrically placed pads and the reference plate has a thin central web in the region encompassing the pads.

17. The pressure transducer of claim 13, including an annular grounded guard electrode on the diaphragm between the sensor electrode from the reference electrode thereon to electrically isolate the same.

18. The pressure transducer of claim 13, wherein said sensor electrode on the diaphragm and said reference electrode on the diaphragm are each substantially in the form of an annulus concentric with the center, and said sensor electrode on the reference plate and said reference electrode on the cover are also substantially in the form of annuli.

19. The pressure transducer of claim 13, said diaphragm, reference plate and cover means are comprised of materials from the class including high density ceramic materials, quartz, silicon, silica and the like which are mechanically elastic but do not exhibit significant plasticity.

20. A capacitive pressure transducer comprising:
a diaphragm having a substantially flat deformable surface, the diaphragm including an annular sensor electrode disposed about a central deformable region thereof concentric with a central axis, an annular reference electrode, said electrodes each terminating in a conductive contact path to the exterior, an electrically grounded guard electrode and positioned between said sensor electrode and said reference electrode, said sensor electrode, said reference electrode, and said guard electrode being concentric about the central axis, and said diaphragm further including thin film conductive means in the central region of said diaphragm including a conductive path to the exterior of the transducer;
means communicating with at least one side of the diaphragm for introducing a fluid whose pressure is to be determined into contact with the diaphragm to deform same;
a substantially planar reference plate disposed in facing relation to the deformable surface of the diaphragm, said reference plate having an annular sensor electrode disposed about the central region and facing the sensor electrode on the diaphragm to form a sensing capacitor therewith, and thin film conductive means in the central region of said reference plate, including a conductive path to said sensor electrode on said reference plate;
conductive spacer means interconnecting the diaphragm and the reference plate in the central region thereof to maintain a substantially fixed dimension in the central region between the diaphragm and the reference plate while permitting deformation of the diaphragm, said spacer means interconnecting the thin film conductive means on said diaphragm with the thin film conductive means on the reference plate, whereby an electrical connection from the sensor electrode on the reference plate is taken through the spacer means; and
a cover disposed about the reference plate, said cover comprising a depending flange connected to the outer periphery of the diaphragm, and including an annular reference electrode in facing relation to the reference electrode on the diaphragm, to form a reference capacitor therebetween, said reference electrode on said cover terminating in a conductive path to the exterior.

21. The invention as set forth in claim 20 above, wherein said spacer means interconnecting the diaphragm and the reference plate are comprised of a vitrified glass-containing composition.

22. The invention as set forth in claim 20 above, further including a vitrified glass-containing bead mounted around the periphery of the outer lower edge of the flange of said cover and coupling the cover to the outer periphery of the diaphragm.

23. The invention as set forth in claim 20 above, wherein the means for introducing a fluid comprises means for providing a fluid of variable pressure to the side of the diaphragm opposite the reference plate.

24. The invention as set forth in claim 23 above, wherein the spacer means comprises a single spacer centrally disposed on the diaphragm.

25. The invention as set forth in claim 20 above, wherein the spacer means comprises a first number of spacers symmetrically disposed about the center of the diaphragm at a diameter less than 25% of the diameter of the deformable portion of the diaphragm, and wherein a second number of spacers are symmetrically disposed about the periphery of the diaphragm and the cover, outside the radius of the reference capacitor.

26. The invention as set forth in claim 25 above, further including thin film conductive means coupling the reference electrode on the cover to one of the second number of spacers, and wherein the means for introducing fluid comprises means for providing fluids to the opposite sides of the diaphragm such that differential pressure may be measured, and further including filter means coupled between the means for introducing fluid and the transducer interior for blocking conductive media therefrom.

27. A capacitive pressure transducer comprising:
 a diaphragm having a central web deflectable in response to a pressurized fluid acting against a first side thereof, the diaphragm including a peripheral flange;
 a cover adjacent the second side of the diaphragm and coupled thereto at the peripheral flange;
 reference capacitor means disposed between the diaphragm and cover in the peripheral flange region;
 reference plate means mounted on the second side of the central web and movable with deflection thereof; and
 sensing capacitor means disposed between the second side of the diaphragm and the reference plate means.

28. A capacitive pressure transducer comprising a diaphragm having a peripheral flange bounding a central deflectable web that deflects in response to a pressurized fluid acting on a first side thereof, without substantial deflection of the flange;
 cover means adjacent the second side of the diaphragm and coupled thereto at the peripheral flange;
 plate means mounted on but principally spaced apart from the second side of the diaphragm at the web and movable therewith;
 first capacitor means responsive to the distance between the web and the plate means; and
 second capacitor means responsive to the distance between the flange and the cover means.

29. A pressure responsive capacitive transducer comprising:
 a diaphragm having a deformable central region responsive to pressure applied to one side thereof, the diaphragm including a thin film electrode thereon;
 a planar element disposed adjacent but spaced apart from the deformable central region of the diaphragm and including a thin film electrode in facing relation to the thin film electrode on the diaphragm; and
 conductive spacer means disposed in the maximum deflection portion of the deformable central region of the diaphragm for (1) mechanically coupling the planar element to move with the deformable central region of the diaphragm and (2) providing electrical coupling to the thin film electrode on the diaphragm.

30. The invention as set forth in claim 29 above, wherein the conductive spacer means has a width of less than about 25% of the diameter of the deformable portion of the diaphragm.

* * * * *

Disclaimer and Dedication

4,562,742—*Robert L. Bell*, Chatsworth, Calif. CAPACITIVE PRESSURE TRANSDUCER. Patent dated Jan. 7, 1986. Disclaimer and Dedication filed Sept. 6, 1991, by the assignee, Bell Microcomponents, Inc.

Hereby disclaims and dedicate to the Public the remaining term of said patent.
*[Official Gazette December 17, 1991]*